United States Patent Office 3,352,634
Patented Nov. 14, 1967

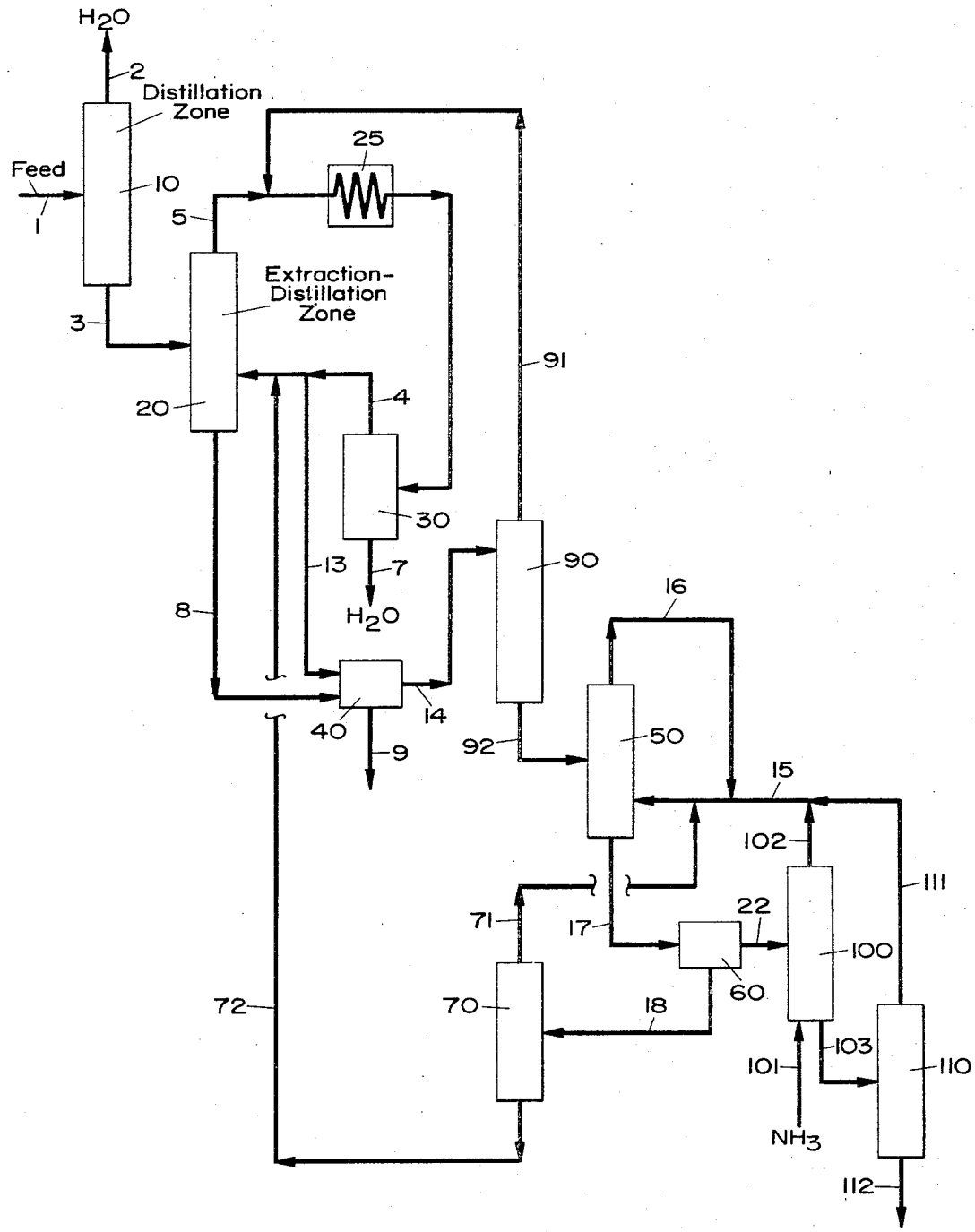

3,352,634
PURE MAGNESIUM CHLORIDE PREPARED
BY THE SIMULTANEOUS EXTRACTION
AND AZEOTROPIC DRYING OF A SALT
MIXTURE
Fred J. Buchmann, Baton Rouge, La., assignor to Esso
Research and Engineering Company, a corporation of
Delaware
Filed May 25, 1965, Ser. No. 458,729
8 Claims. (Cl. 23—91)

ABSTRACT OF THE DISCLOSURE

Magnesium chloride is dehydrated utilizing a magnesium chloride solvent such as an alcohol in a distillation zone whereby an azeotropic mixture of alcohol and water is removed overhead. It is preferred to use a solvent mixture wherein the alcohol is mixed with a hydrocarbon. The solution of magnesium chloride is removed from the distillation zone, filtered to remove insoluble impurities, then contacted with ammonia to produce the hexammoniate precipitate which is subsequently treated to separate ammonia from dehydrated magnesium chloride.

---

The present invention is broadly concerned with the purification and dehydration of magnesium chloride so as to produce anhydrous magnesium chloride which may be further processed as, for example, by means of an electrolytic cell. The invention is more specifically concerned with the technique for the dehydration of magnesium chloride utilizing a plurality of integrated processing zones wherein the last traces of water are removed and the $MgCl_2$ is recovered by way of the ammoniate. Specifically, a very pure anhydrous magnesium chloride product is prepared by the simultaneous extraction and azeotropic drying of a salt mixture containing hydrated magnesium chloride and impurities such as alkali chlorides, magnesium sulfate, and the like.

In accordance with the preferred adaptation of the present invention a magnesium chloride solvent is used in the extraction-azeotropic drying zone in conjunction with an entraining solvent. It is also preferred to recover the anhydrous magnesium chloride from the ammoniate utilizing a two-stage recovery operation.

It is known in the art that naturally occurring magnesium chloride, ores or brines, generally contain water associated therewith, usually about six molecules of water of hydration ($MgCl.6H_2O$) with the ores. It is also known in the art that by general dehydration processes it is possible to remove about four molecules of water without securing undesirable side reactions. However, if further dehydration is continued by known techniques in order to remove the remaining two molecules of water, undesirable side reactions occur such as the formation of magnesium hydroxy chloride, magnesium oxide and hydrochloric acid. This is very undesirable, particularly if the magnesium chloride is to be further processed by electrolysis.

It has now been discovered that, if a plurality of integrated processing stages is utilized, particularly in combination with the simultaneous extraction and azeotropic drying of a salt mixture feed, a very pure, high quality, anhydrous magnesium chloride product is produced. This is particularly the situation if a magnesium chloride solvent is used in the extraction-azeotropic zone in combination with an entraining solvent.

The process of the present invention may be more fully understood by reference to the drawing illustrating a preferred embodiment of the same. In accordance with the present invention, feed material in the form of an aqueous solution of a salt mixture is introduced into a partial drying zone 10 by means of line 1. It is preferred that drying zone 10 be a spray dryer or a conventional fluidized bed of the partially dried salt mixture. However, other conventional means of partially drying a salt mixture may be used also. If a fluidized bed is used, additional heat to accomplish the partial dehydration may be introduced either with the inert fluidizing gas which may comprise an inert gas such as nitrogen or combustion gases. The necessary heat may also be introduced indirectly through heat exchange surfaces. The feed material may be quite impure such as a naturally occurring brine or the aqueous solution from a naturally occurring salt mixture or the solution from partial processing of such a mixture. Generally, in addition to magnesium chloride, many impurities are present, such as the alkali chlorides (sodium chloride and potassium chloride) as well as magnesium sulfate, sodium or calcium sulfate, and other inorganic impurities. The starting feed solution may contain 10 to 35% or more of $MgCl_2$. Although the above-described impurities generally are present, a pure $MgCl_2$ solution may also be used.

Partial dehydration zone 10 is maintained at a temperature in the range of 250° to 350° F., such as about 275° F. and at a pressure of 0 to 15 p.s.i.g., such as about 10 p.s.i.g. Operating conditions are adjusted so that the water remaining after the partial dehydration is equivalent to from about 2 to 7 mols of water per mol of contained $MgCl_2$ or from about 25% to 60%, such as about 50%, water on the partially dried solids.

On the other hand, the starting feed material may be a solid, naturally occuring salt mixture and, if so, is ground to a particle size in the range from about 40 to 100 mesh as, for example, from about 60 to 80 mesh, such as 70 mesh. This starting solid feed may be fed directly into extraction zone 20 bypassing partial dehydration zone 10.

Water is removed from the spray dryer zone 10 by means of line 2 while a partially dehydrated magnesium chloride containing from about 2 to 4 molecules of water of hydration is removed by means of line 3 and introduced into extraction-azeotropic drying zone 20. A magnesium chloride solvent as, for example, a low boiling alcohol containing from about 4 to 10 carbon atoms, is introduced into zone 20 by means of line 4. Preferred solvents are isoamyl alcohol, n-butyl alcohol, iso-hexyl alcohol and iso-octyl alcohol. Other satisfactory solvents are oxygenated solvents, such as low molecular weight ketones, glycols and diketones. The preferred solvents boil in the range from about 240° F. to about 340° F.

As pointed out hereinbefore, the preferred technique is to use, in conjunction with the magnesium chloride solvent, an entraining solvent characterized in that the magnesium chloride is not soluble therein. These entraining solvents are, for example, hydrocarbons such as heptane, octane, nonane, decane, toluene, xylene or a petroleum fraction. The entraining solvents preferably boil within the range of from about 220° F. to 350° F. The amount of entraining solvent present, based upon the amount of total solvent present, is in the range from about 10% to 70% by volume, preferably in the range from about 30% to 50% by volume such as about 40% by volume. The presence of the entraining solvent in conjunction with the magnesium chloride solvent is to effect a more efficient removal of water overhead from extraction-distillation zone 20 and also to effect a sharper separation of the respective phases in separation zone 30.

The amount of solvent used in zone 20 is sufficient to provide a magnesium chloride solution containing about 2% to 20% $MgCl_2$ by weight, preferably 5 to 10% by weight, such as about 8% by weight. The temperature conditions maintained in zone 20 are preferably at the boiling point of the alcohol. The pressure maintained in zone 20 is in the range from about 0 to 20 p.s.i.g., preferably about 10 p.s.i.g.

Under these conditions the magnesium chloride is dissolved in the magnesium chloride solvent, such as isoamyl or hexyl alcohol. The azeotropic mixture of alcohol-water and entraining solvent and some excess alcohol are removed by means of line 5, passed through condenser zone 25, and passed to separation zone 30. In zone 30 temperature and pressure conditions are adjusted so as to maintain liquid phases. Under these conditions, an upper phase comprising the magnesium chloride solvent and the entraining solvent is formed and a lower phase comprising mainly water, is formed. The solvent phase is removed by means of line 4 and recycled to zone 20 while the lower aqueous phase is removed by means of line 7. If desirable, the alcohol associated with the lower aqueous phase may be recovered in a subsequent distillation operation.

The alcohol solution of magnesium chloride, along with undissolved contaminants such as the alkali metal halides, is removed from zone 20 by means of line 8 and passed into a filter zone 40. Under these conditions the undissolved impurities are separated and removed by means of line 9. It is preferred to wash the filter in zone 40 free of $MgCl_2$ solution with additional alcohol or alcohol-entrainer mixture which is introduced into filter zone 40 by means of line 13. The temperature in filter zone 40 is 10° to 50° F. below the boiling point of the alcohol-entrainer mixture at pressures near atmospheric pressure. Alcohol or alcohol-entrainer adhering to the rejected impurities removed by line 9 may be recovered by dissolving the rejected salts in the lower aqueous phase from line 7 above prior to the distillation.

The anhydrous magnesium chloride solution is removed from separation or filter zone 40 by means of line 14 and introduced into the top of a finishing drying tower, or zone 90. The solution of magnesium chloride flows downwardly in zone 90 and temperature and pressure conditions are adjusted so as to remove overhead from zone 90 by means of line 91 from about 3% to 10%, preferably about 5% of the solvent. Under these conditions all traces of water are removed from the magnesium chloride solution. The overhead from zone 90 is passed through condensing zone 25 and thence into separation zone 30 wherein the same is handled as hereinbefore described.

The bone dry magnesium chloride solution is withdrawn from the bottom of zone 90 by means of line 92 and introduced into ammonia reaction zone 50 wherein the same is contacted with ammonia, preferably dry ammonia gas which is introduced into zone 50 by means of line 15. The ammonia gas is removed overhead from zone 50 by means of line 16 and preferably recycled to the system.

The temperature in zone 50 is maintained in the range from about 10° to 150° F. below the boiling point of the alcohol-entrainer mixture and is adjusted to give optimum particle size of the precipitated ammoniate. The pressure in zone 50 is in the range of from about 5 to 20 p.s.i.g., such as about 10 p.s.i.g. The amount of ammonia used based upon the amount of magnesium chloride is in the range of from about 110 to 300 wt. percent such as about 200 wt. percent. Good contacting of the ammonia and the solution is required.

Under these conditions the magnesium chloride forms a precipitate of $MgCl_2 \cdot 6NH_3$. This product slurry is withdrawn from zone 50 by means of line 17 and introduced into a filter zone 60 wherein the precipitated magnesium chloride ammoniate is separated from the solvent which is removed by means of line 18 and passed to a distillation zone 70 wherein ammonia is separated from the solvent such as a solvent mixture of hexyl alcohol and toluene. The ammonium is removed overhead from zone 70 by means of line 71 and recycled preferably to zone 50 while the solvent mixture is removed as a bottoms stream by means of line 72 and preferably recycled to extraction-distillation zone 20.

The anhydrous magnesium chloride ammoniate is withdrawn from separation zone 60 by means of line 22 and introduced into a two-stage decomplexing zone comprising stages 100 and 110. The anhydrous magnesium chloride ammoniate is introduced into the first stage 100 wherein the same is contacted with a fluidized bed of partially decomposed magnesium chloride ammoniate particles. The fluidizing gas comprises ammonia which is introduced by means of line 101 and removed by means of line 102. The temperature in zone or stage 100 is about 10° to 100° F. such as about 60° F. above the boiling point of the magnesium chloride solvent, such as isoamyl alcohol. Under these conditions all traces of organic solvents are removed and the magnesium chloride ammoniate is partially decomposed. The solvent-free magnesium chloride ammoniate is removed by means of line 103 and introduced into a final decomplexing stage 110. In stage or zone 110 the temperature is in the range from about 700° to 900° F., preferably 800° to 900° F., such as about 850° F. Under these conditions ammonia is removed overhead by means of line 111 and recycled preferably to zone 50. Anhydrous magnesium chloride is removed by means of line 112 and further processed, preferably in an electrolytic cell.

The pressure in the first stage 110 is in the range from about 5 to 20 p.s.i.g. such as about 10 p.s.i.g. Although the pressure in the second stage may be maintained in this range, it is preferred that the pressure in the second stage 110 be lower than the pressure in the first stage 100 to facilitate the decomplexing. It is preferred that the pressure in the second stage be about 1–15 p.s.i.a. such as about 3 p.s.i.a.

As pointed out hereinbefore, by using an entraining solvent to contact the partially dehydrated solids, the entraining solvent will improve the azeotroping of the remaining water and, at the same time, will not prevent the formation of an anhydrous solution of magnesium chloride. After separation of the undissolved impurities, such as alkali metal halides, magnesium chloride hexammoniate is precipitated utilizing dry ammonia gas. The precipitated magnesium chloride ammoniate may be separated from the organic solvents using any type of filter such as a rotary one. As an alternate to final solvent removal by evaporation with hot ammonia gas, it is possible to wash the ammoniate on the filter with liquid ammonia. Other wash solvents may be used such as saturated hydrocarbons as, for example, butane or pentane which do not form azeotropes with the alcohol solvent. However, the solvent recovery system must be altered accordingly.

In order to further illustrate the invention, the following example is given.

*Example*

A feed material having the following composition was introduced into a spray drying zone:

| | Wt. percent |
|---|---|
| $MgCl_2$ | 17.98 |
| $MgSO_4$ | 4.55 |
| KCl | 5.34 |
| NaCl | 4.07 |
| $H_2O$ | 68.06 | maintained at a temperature of about 300° F. From 210 lbs. of starting solution, approximately 110 lbs. of water were removed in the spray drying zone leaving a product having the following composition.

| Product: | Pounds |
|---|---|
| $MgCl_2$ | 37.8 |
| $H_2O$ | 32.9 |
| Other salts | 29.3 |

This material was then mixed with about 500 lbs. of isoamyl alcohol at the boiling point of the alcohol and the remaining quantities of water, namely 32.9 lbs., were azeotroped overhead.

The solution was filtered to remove about 29.3 lbs. of impurities consisting of the alkali metal halides and $MgSO_4$. The filtered magnesium chloride solution contained about 37.6 lbs. of magnesium chloride and about 400 lbs. of isoamyl alcohol. This solution was then contacted with anhydrous ammonia to form about 78 lbs. of magnesium chloride hexammoniate. The hexammoniate was treated as described to produce an anhydrous magnesium chloride having in excess of 99% purity.

What is claimed is:

1. Process for the removal of water of hydration from hydrated magnesium chloride which comprises contacting the same in an extraction-distillation zone in the presence of a magnesium chloride solvent under temperature and pressure conditions to remove overhead as an azeotropic distillation the water of hydration together with some magnesium chloride solvent, withdrawing the magnesium chloride solution from the extraction-distillation zone and filtering the same in order to remove undissolved impurities therefrom, thereafter treating the solution in a second distillation zone under conditions to remove overhead a portion of said magnesium chloride solvent, withdrawing the remainder of the magnesium chloride solution from the bottom of said second distillation zone and contacting the same in a precipitation zone with ammonia whereby an insoluble magnesium chloride hexammoniate forms, separating the precipitate and thereafter treating the magnesium chloride ammoniate in a first stage of a decomplexing zone with ammonia so as to remove all traces of said magnesium chloride solvent therefrom, subjecting the partially decomplexed ammoniate in a second stage of said decomplexing zone to temperature and pressure conditions to remove ammonia and to produce anhydrous magnesium chloride.

2. Process as defined by claim 1 wherein about 3% to 10% of the magnesium chloride solvent is removed overhead in said second distillation zone.

3. Process as defined by claim 1 wherein said magnesium chloride solvent is selected from the class consisting of alcohols and ketones.

4. Process as defined by claim 1 wherein said magnesium chloride solvent comprises hexyl alcohol.

5. Process for the removal of water of hydration from hydrated magnesium chloride which comprises contacting the same to an extraction-distillation zone in the presence of a solvent mixture comprising a magnesium chloride solvent and a hydrocarbon entraining solvent characterized in that the magnesium chloride is not soluble therein, under conditions to remove overhead from said extraction distillation zone water and a portion of the solvent mixture, removing as a bottoms from said extraction distillation zone, a solution of magnesium chloride, filtering the same to remove undissolved impurities therefrom, thereafter treating the solution of magnesium chloride in a second distillation operation to remove overhead a portion of said magnesium chloride solvent, withdrawing the remainder of the magnesium chloride solution from said second distillation zone and contacting the same with ammonia under conditions to form a magnesium chloride hexa-ammoniate precipitate, thereafter treating the precipitate in a first stage of a decomplexing zone with ammonia so as to remove overhead ammonia and magnesium chloride solvent, thereafter subjecting the precipitate in a second stage of said decomplexing zone to temperature and pressure conditions to produce ammonia which is removed overhead, and an anhydrous magnesium chloride product.

6. Process as defined by claim 5 wherein said magnesium chloride solvent is selected from the class consisting of alcohols and ketones and wherein said hydrocarbon entraining solvent boils in the range from about 220° F. to 350° F.

7. Process as defined by claim 6 wherein the amount of hydrocarbon entraining solvent present in said solvent mixture is in the range from about 10% to 70% by volume based upon the total solvent mixture.

8. Process as defined by claim 7 wherein the amount of magnesium chloride solvent present in said extraction-distillation zone is sufficient to produce a magnesium chloride solution of a concentration in the range from about 2% to 20% by weight.

References Cited

UNITED STATES PATENTS

| | | | |
|---|---|---|---|
| 2,381,994 | 8/1945 | Belchetz | 23—91 |
| 2,381,995 | 8/1945 | Belchetz | 23—91 |
| 3,092,450 | 6/1963 | Christensen et al. | 23—91 |

OTHER REFERENCES

Dawson et al.: Article, Journ. Amer. Chem. Soc., pages 4134 and 4137 of volume 74 (1952).

OSCAR R. VERTIZ, *Primary Examiner.*

EDWARD STERN, *Examiner.*